April 16, 1968    M. H. DOEGLAS ET AL    3,378,302
VEHICLE FOR THE TRANSPORT OF BULK MATERIAL
Filed Aug. 18, 1966    4 Sheets-Sheet 1

INVENTORS
MARCUS HENDRIK DOEGLAS
JOHANNES CORNELIS HEIJDRA
BY

ATTORNEY

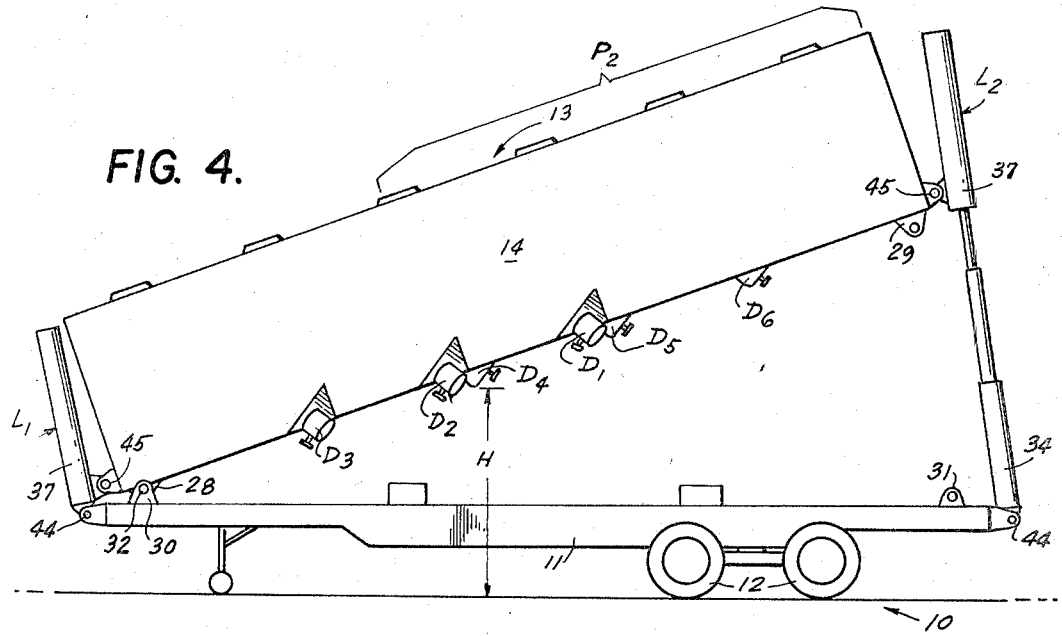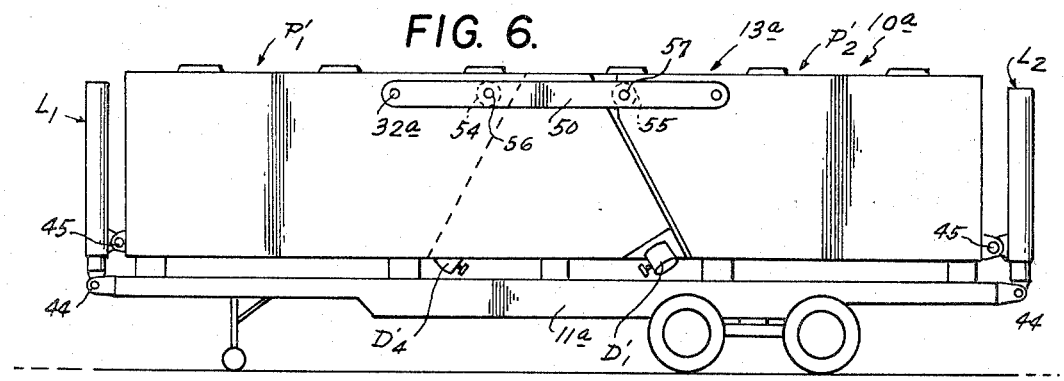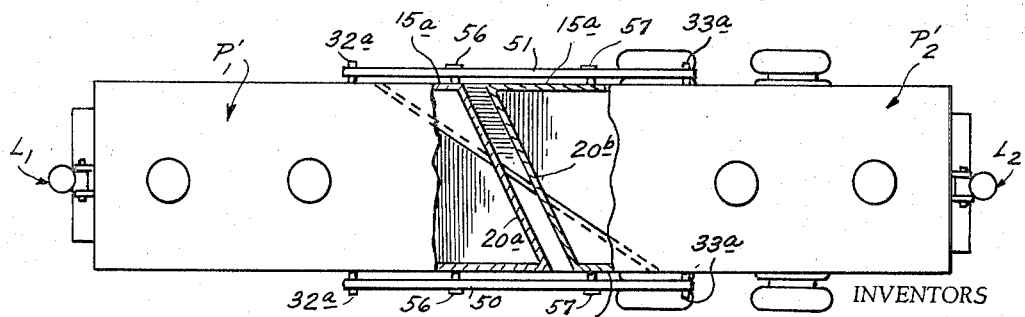

INVENTORS
MARCUS HENDRIK DOEGLAS
JOHANNES CORNELIS HEIJDRA
BY

ATTORNEY

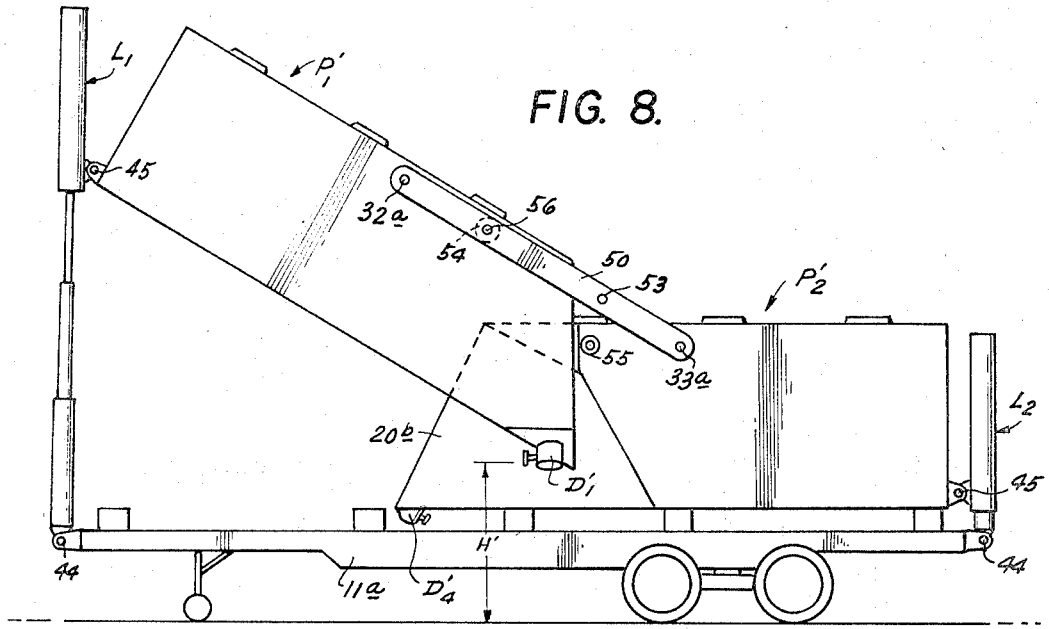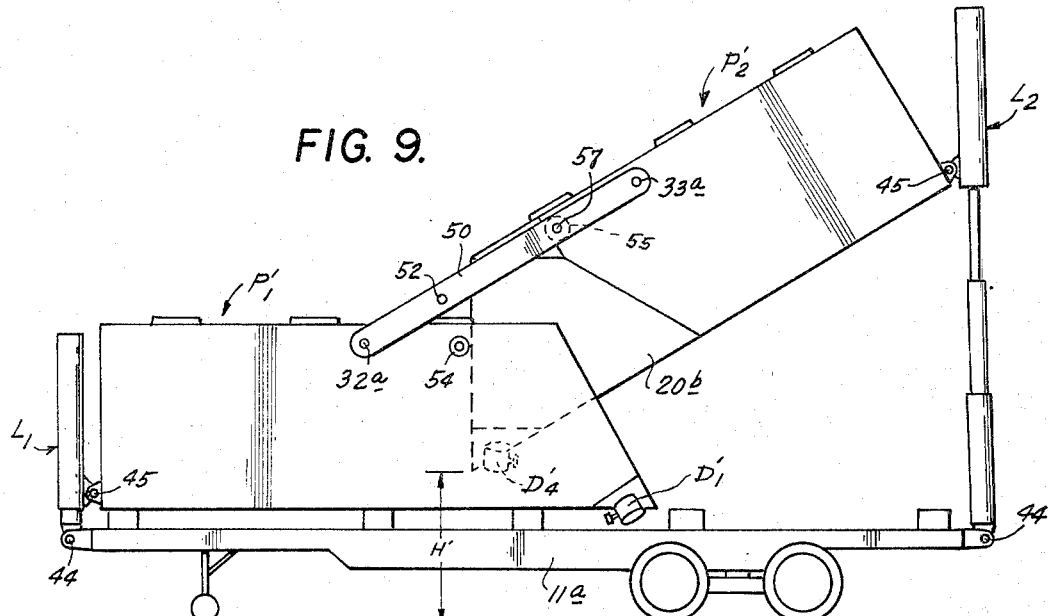

United States Patent Office 3,378,302
Patented Apr. 16, 1968

3,378,302
VEHICLE FOR THE TRANSPORT OF
BULK MATERIAL
Marcus Hendrik Doeglas, Amsterdam, and Johannes
Cornelis Heijdra, Rozenburg, Netherlands, assignors
to Koninklijke Zwavelzuurfabrieken Voorheen Ketjen
N.V., Amsterdam, Netherlands, a limited-liability company of Netherlands
Filed Aug. 18, 1966, Ser. No. 573,242
Claims priority, application Netherlands, Aug. 20, 1965,
65—10,904
8 Claims. (Cl. 298—8)

This invention relates generally to trucks or similar vehicles for transporting bulk materials which flow readily.

Silo or tank trucks have been provided for the road transport of bulk materials, and from which the bulk material may be discharged by pouring therefrom under the influence of gravity with or without the assistance of auxiliary discharging mechanisms, such as, conveyor worms or belts, or of arrangements for applying compressed air to the contained bulk material. In order to further facilitate discharge by gravity, the bodies of trucks containing the transported bulk material have been made tiltable relative to the chassis so as to incline the body in the direction toward the discharge opening or openings thereof. Some of the existing vehicles provided with tiltable bodies for transporting bulk materials have the tilting axis of the body arranged at the bottom of the rear end thereof, and the force for tilting the body is applied either at the front end or at a location under the body intermediate the ends thereof. Other vehicles of the described character have the body thereof mounted for tilting selectively about a laterally extending axis at the rear thereof, or about one or the other of longitudinally extending axes at the opposite sides of the body, with the force for effecting the tilting being applied to the underside of the body intermediate the ends and sides thereof.

In all of the foregoing arrangements wherein the body is merely tilted to facilitate the gravity discharge of the bulk material through one or more discharge openings which are located adjacent the lowermost point or points of the body in the tilted position or positions thereof, the tilting of the body does not substantially elevate the discharge opening above the position it occupies with respect to the ground in the normal or level position of the body. Thus, where the body is merely tilted to effect the gravity discharge of material therefrom, difficulty may be experienced in pouring the material from the discharge opening of the body into a relatively tall container or into the relatively high end of an inclined chute or the like provided for conveying the discharged material away from the transport vehicle.

In order to overcome the foregoing disadvantage, vehicles for transporting bulk materials have been provided wherein, when discharge is to be effected, the body containing the load is displaced upwardly, as a whole, from its normal position on the chassis and, after having been thus raised to a predetermined height, is further tipped or inclined in the direction toward its discharge opening or openings each of which is thereby elevated with respect to its normal position although being disposed at a relatively low point of the tilted body so that the bulk material pouring therethrough can be discharged into a relatively tall container or into the relatively high end of a chute for transporting the discharged material away from the transport behicle. However, vehicles of the last described type have complex structural arrangements for effecting the combined raising and tilting movements of the body, and such complex structural arrangements are costly and difficult to maintain as well as undersirably increasing the empty or unproductive weight of the vehicle.

Accordingly, it is an object of this invention to provide in a vehicle having a body for containing the bulk material to be transported, a relatively simple arrangement for displacing the body from its normal position on the chassis so as to effect the gravity discharge of material from the body through discharge openings which are raised from their normal positions, upon displacement of the body, for example, to a height as much as ten feet above the ground.

In accordance with an aspect of this invention, the elongated body of a vehicle for the transport of bulk material is provided with partition means extending laterally across the body intermediate its ends to divide the body into first and second portions defining compartments for containing the bulk material to be transported and each having discharge means opening from the bottom thereof at least adjacent the partition means for discharging bulk material from the respective compartments, the first and second body portions are pivotally mounted for selective tilting relative to the vehicle chassis about first and second laterally extending axes which are spaced from the partition means in directions along the chassis toward the ends of the latter remote from the first and second body portions, respectively, a first lifting device is connected between the chassis and the first body portion at a location on the latter spaced from the partition means and is operable to swing at least the first body portion upwardly about the first axis so that the first body portion is bodily raised from the chassis and tilted downwardly toward the discharge means thereof which is adjacent the partition means, a second lifting device is connected between the chassis and the second body portion at a location on the latter spaced from the partition means and is operable to swing at least the second body portion upwardly about the second axis so that the second body portion is bodily raised from the chassis and tilted downwardly toward its discharge means adjacent the partition means, and actuating means is provided to selectively operate the first and second lifting devices individually.

In one form of the invention, the first and second portions of the vehicle body are integral with each other, and the first and second axes are disposed adjacent the opposite ends of the elongated body and are defined, for example, by hinge parts secure to the body adjacent its opposite ends for alignment with corresponding hinge parts secured to the chassis, and by removable hinge pins for releasably connecting the aligned hinge parts on the body and chassis, whereby the hinge pins defining each of the tilting axes are removed when the body is to be tilted about the other of the axes.

In another form of the invention, the first and second body portions are separate from each other so as to be independently tiltable and have inner end walls constituting the partition means, and such separate body portions are pivotally mounted by means of levers extending along the opposite sides of the body and having pivots connecting their opposite ends to the first and second body portions, respectively, to constitute the first and second tilting axes, with releasable locking means being provided for individually securing each of the body portions against pivoting with respect to the levers.

In vehicles constructed in accordance with the last described form of the invention, the actuating means for selectively operating the first and second lifting devices preferably includes safety means to permit the operation of one or the other of the lifting devices only when the locking means for releasably securing the body portions with respect to the levers are correctly conditioned for tilting of the body portion by the lifting device which is to be operated.

Another object of the invention is to provide a vehicle of the described character in which all of the wall surfaces leading to the discharge means of each body portion are inclined from the vertical when the respective body portion is tilted or inclined in the direction toward the discharge means so as to avoid the occurrence of dead spaces in which undischarged material can accumulate and thereby facilitate the gravity discharge of the bulk material.

Accordingly, it is a feature of this invention to dispose the partition means, which divides the body into two portions, at an angle with respect to the perpendicular to the sides of the body so that such partition means encloses, with the sides of the body, an acutely angled corner at one side of each of the body portions, and to dispose the discharge means opening from each of the body portions adjacent the partition means in the acutely angled corner of the respective body portion.

When the body portions are separate from each other and independently tiltable relative to the chassis, it is particularly preferred that the levers for mounting the body portions be connected to the latter adjacent the tops thereof, and that the partition means be laterally twisted or otherwise shaped so that the angle enclosed by the partition means and the side of the respective body portion at the acutely angled corner thereof is greater at the top of the partition means than at the bottom of the latter, thereby to minimize the required lengths of the levers by which the separate body portions are pivotally mounted.

The above, and other objects, features and advantages of the invention will be apparent in the following detailed description of illustrative embodiments thereof which is to be read in connection with the accompanying drawings, wherein:

FIGS. 3 and 4 are views similar to that of FIG. 1, but showing the body of the vehicle in two different positions for discharging bulk material from the body;

FIG. 6 is a view similar to that of FIG. 1, but showing a vehicle for the transport of bulk material in accordance with another embodiment of this invention;

FIG. 7 is a top plan view of the vehicle of FIG. 6;

FIGS. 8 and 9 are views similar to that of FIG. 6, but showing the body of the vehicle in two different positions for discharging the bulk material therefrom;

Figure 1:
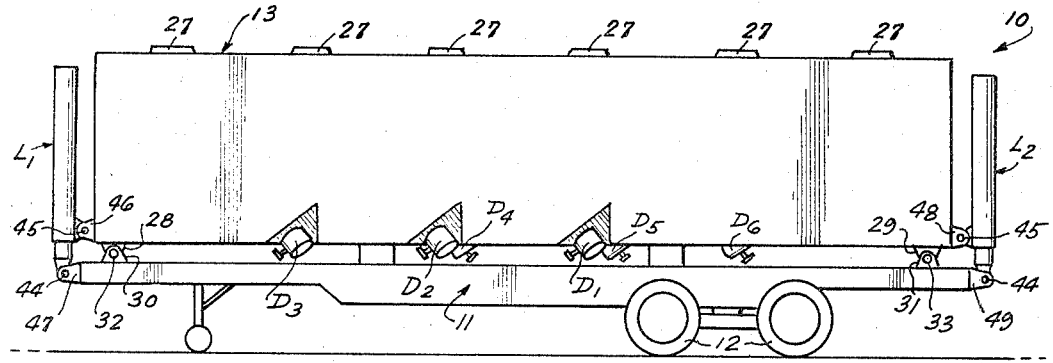
FIG. 1 is a side elevational view of a vehicle for the transport of bulk material in accordance with one embodiment of this invention, and which is shown with its body in the normal position.

Referring to the drawings in detail, and initially to FIGS. 1 to 4, inclusive, it will be seen that a vehicle in accordance with this invention is there generally identified by reference numeral 10 and shown in form of a truck trailer which is adapted to be connected in the usual manner to a tractor truck (not shown) so as to be drawn by the latter. The illustrated truck trailer 10 generally includes an enongated chassis 11 supported by ground engaging wheels 12 and an elongated body 13 for containing the bulk material to be transported.

Body 13 includes side walls 14 and 15 (FIG. 2) extending between end walls 16 and 17 from a bottom wall 18 to a top wall 19. Extending across body 13 intermediate its ends is a generally centered partition 20 which divides body 13 into a first portion $P_1$ and a second portion $P_2$. Body portion $P_1$ defines at least one compartment $C_1$ for containing the bulk material to be transported, and, if desired, body portion $P_1$ may be further divided, as by the illustrated partitions 21 and 22, to define additional compartments $C_2$ and $C_3$. Similarly, body portion $P_2$ defines at least one compartment $C_4$ separated from compartment $C_1$ by partition 20, and body portion $P_2$ may also be further divided, as by partitions 23 and 24, so as to define additional compartments $C_5$ and $C_6$ in the event that it is desired to transport and discharge different types or grades of bulk materials.

Figure 2:
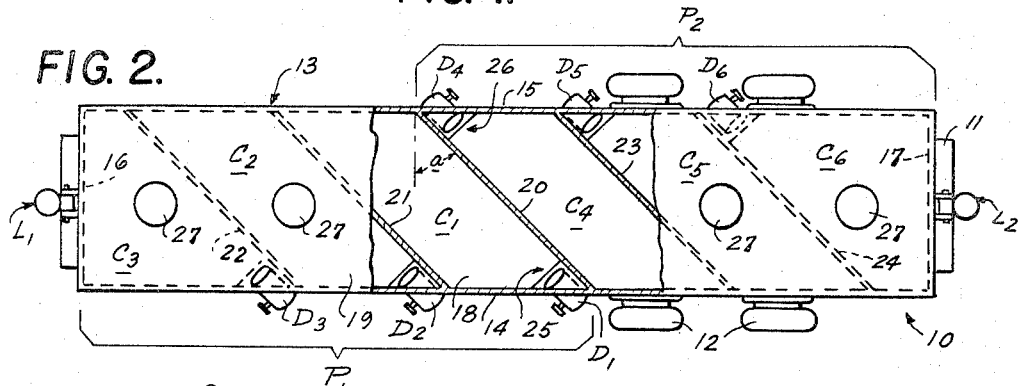
FIG. 2 is a top plan view of the vehicle of FIG. 1 but with the top wall of the body being shown partly broken away.

The central partition 20, and any further partitions provided within body 13, as at 21, 22, 23 and 24, preferably each extend at an angle $a$ with respect to a perpendicular to side walls 14 and 15 of the body. Thus, partition 20 and side wall 14 enclose an acutely angled corner 25 at one side of body portion $P_1$d, and partition 20 and side wall 15 similarly enclosed an acutely angled corner 26 at the opposite side of body portion $P_2$. Where the body portions $P_1$ and $P_2$ are each divided into more than one compartment, as shown in FIG. 2, the partitions 21 and 22 and the partitions 23 and 24 extending parallel to partition 20 also enclose acutely angled corners with side wall 14 and with side wall 15, respectively.

Valved spouts or other suitable discharge means $D_1$, $D_2$ and $D_3$ open from bottom wall 18 in the acutely angled corners enclosed by partitions 20, 21 and 22 with side wall 14 to permit the discharge of bulk material from compartments $C_1$, $C_2$ and $C_3$, respectively. Similarly, valved spouts or other discharge means $D_4$, $D_5$ and $D_6$ open from bottom wall 18 in the acutely angled corners enclosed by partitions 20, 23 and 24 with side wall 15 to permit the discharge of bulk material from compartments $C_4$, $C_5$ and $C_6$. In order to permit the introduction of bulk material into body 13, top wall 19 thereof may be provided with inlet openings communicating with each of compartments $C_1$–$C_6$ and being normally closed by lids 27.

In accordance with this invention, body 13 is mounted on chassis 11 so as to be movable from its normal level position (FIG. 1) which it occupies during transport of the bulk material, to a discharging position (FIG. 3) in which body portion $P_1$ is raised substantially from the chassis and inclined downwardly in the direction toward partition 20, or to a discharging position (FIG. 4) in which body portion $P_2$ is raised substantially from the chassis and inclined downwardly in the direction toward partition 20. In the illustrated vehicle 10, such mounting of body 13 on chassis 11 is effected by hinge parts 28 and 29 fixed at the bottom of body 13 adjacent end walls 16 and 17 thereof for alignment with hinge parts 30 and 31, respectively, secured at suitable locations on chassis 11, and removable hinge pins 32 and 33 which are engageable with aligned hinge parts 28 and 30 and aligned hinge parts 29 and 31, respectively, to define tilting axes for body 13 which are disposed at the bottom of the body adjacent its opposite ends. When body 13 is in its normal or level position of FIG. 1, both hinge pins 32 and 33 may be simultaneously engaged with the respective hinge parts so as to securely anchor body 13 on chassis 11. When body 13 is to be displaced to the discharging position shown on FIG. 3, hinge pin 32 is removed from hinge parts 28 and 30 so as to permit tilting of body 13 about the axis defined by hinge pin 33. Conversely, when body 13 is to be displaced to the discharging position shown on FIG. 4, hinge pin 33 is removed from hinge parts 29 and 31 so as to permit tilting of body 13 about the axis defined by hinge pin 32.

In order to effect selective tilting of body 13 about one or the other of the axes defined by hinge pins 32 and 33, vehicle 10 further includes lifting devices $L_1$ and $L_2$ which are connected between chassis 11 and body portions $P_1$ and $P_2$, respectively, at locations on the related body portions which are spaced from partition 20 separating the later. In the illustrated vehicle 10, each of the lifting devices $L_1$ and $L_2$ is shown to be of a conventional fluid pressure operated type that generally comprises an outer cylinder 34 having cylinders of progressively decreasing diameter, as at 35 and 36, slidably nested or telescoped therein, and a cylindrical cover 37 dimensioned to slidably receive outer cylinder 34 and having a central ram 38 extending axially therein so as to be slidably received in the innermost cylinder 36, as shown on FIG. 5. The closed lower ends of cylinders 35 and 36 have apertures 39 and 40, respectively, so that, when hydraulic or other fluid under pressure is introduced in the lower end of outer cylinder 34, as through conduit 41, such fluid acts progressively to extend cylinder 35 from cylinder 34, to extend cylinder 36 from cylinder 35, and finally to extend central ram 38 from cylinder 36. As shown, brackets 42 and 43 are secured to the lower end of outer cylinder 34 and to the lower end portion of cover 37, respectively, to receive pivot pins 44 and 45 by which the lifting device is pivotally connected to chassis 11 and body 13, respectively.

In the vehicle 10, lifting device $L_1$ has its pivot pin 45 mounted in a bracket 46 extending from the forward end wall 16 of body 13, and its pivot pin 44 mounted in a bracket 47 secured to the adjacent end portion of chassis 11. Similarly, lifting device $L_2$ has its pivot pin 45 mounted in a bracket 48 extending from the rear end wall 17 of body 13, and its pivot pin 44 mounted in a bracket 49 secured to the adjacent or rear end of chassis 11.

Figure 5:
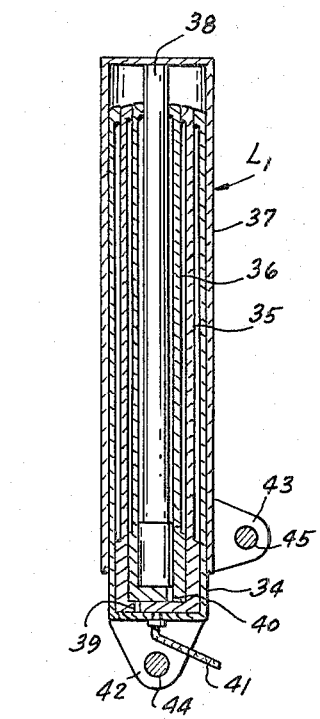
FIG. 5 is an enlarged axial sectional view of a lift device that may be employed in the vehicle of FIG. 1.

It is apparent that, when either of lifting devices $L_1$ and $L_2$ is in its inoperative or contracted condition shown on FIG. 5, the distance between pivot pins 44 and 45 is relatively small to permit the adjacent end of body 13 to rest on chasis 11. However, when either of lifting devices $L_1$ and $L_2$ is operated or extended by the supplying of hydraulic fluid under pressure thereto, the distance between its pivot pins 44 and 45 is very greatly increased, as shown on FIG. 3 or on FIG. 4, thereby to raise the adjacent end of body 13 to a very substantial height above chassis 11.

The vehicle 10 in accordance with this invention is intended to operate as follows:

When it is desired to discharge bulk material from a compartment or compartments in body portion $P_1$, hinge pin 32 is removed from hinge parts 28 and 30 and hydraulic fluid is suitably supplied to lifting device $L_1$ so as to operate or extend the latter and thereby substantially tilt body 13 relative to chassis 11 about the axis defined by hinge pin 33, which tilting axis is substantially spaced from the partition 20 in the direction along the body away from body portion $P_1$. Thus, when body 13 is tilted to the position shown on FIG. 3 by the operation of lifting device $L_1$, body portion $P_1$ is inclined downwardly in the direction toward partition 20 and further has its end defined by that partition substantially raised with respect to chassis 11 so that the discharge spout $D_1$ opening from body portion $P_1$ at the lowest point thereof adjacent partition 20 is elevated substantially with respect to its normal position (FIG. 1). The elevated discharge spout $D_1$ may be disposed at a considerable height H (FIG. 3), for example, as much as ten feet above the ground. Since the other discharge spouts $D_2$ and $D_3$ opening from compartments in body portion $P_1$ are disposed at greater distances from the pivoting axis defined by hinge pin 33 than discharge spout $D_1$, it will be apparent that such additional discharge spouts $D_2$ and $D_3$ are disposed at even greater heights than spout $D_1$ in the tilted position of body 13. Thus, the bulk material in compartments $C_1$, $C_2$ and $C_3$ can be conveniently discharged through the respective spouts $D_1$, $D_2$ and $D_3$ into relatively tall containers, or into the relatively high ends of inclined conveyors for transporting the discharged bulk material away from vehicle 10.

Following the discharge of material from the compartment or compartments in body portion $P_1$, lifting device $L_1$ is returned to its contracted or inoperative position by the exhausting of hydraulic fluid therefrom, and hinge pin 32 is reengaged with hinge parts 28 and 30. When it is desired to discharge bulk material from a compartment or compartments in body portion $P_2$, hinge pin 33 is removed from hinge parts 29 and 31, and lifting device $L_2$ is operated or extended to tilt body 13 about the axis defined by hinge pin 32 to the position shown on FIG. 4. Since the tilting axis defined by hinge pin 32 is substantially spaced from partition 20 in the direction along body 13 away from body portion $P_2$, it will be apparent that, in the tilted position of FIG. 4, body portion $P_2$ is tilted or inclined downwardly toward partition 20 and further has its end defined by that partition raised substantially from its normal position on chassis 11. Thus, the discharge spout $D_4$ opening from body portion $P_2$ at the lowest point thereof adjacent partition 20 is elevated substantially with respect to its normal position (FIG. 1), for example, to a height H which may be as much as ten feet above the ground. The other discharge spouts $D_5$ and $D_6$ opening from compartments in body portion $P_2$, being disposed at greater distances from the pivoting axis of pin 32 than discharge spout $D_4$, will be at even greater heights than spouts $D_4$ in the tilted position of body 13 shown on FIG. 4. Thus, the bulk material in compartments $C_4$, $C_5$ and $C_6$ can also be conveniently discharged through the respective spouts into relatively tall containers or into the relatively high ends of inclined conveyors for transforming the discharge bulk material away from vehicle 11.

Since partition 20 and any other partitions dividing the interior of body 13 extend at an angle $a$ with respect to the perpendicular to side walls 14 and 15, and thereby define acutely angled corners, as at 25 and 26, from which the discharge spouts of the respective compartments extend, all of the inner wall surfaces of each compartment which extend to the respective discharge spout are inclined from the vertical toward the spout when body 13 is positioned, as described above, for discharging bulk material from the compartment in question, thereby to avoid the presence of dead areas and facilitating the gravity discharge of the material. The angle enclosed in each acutely angled corner having a discharge spout opening therefrom is dependent upon the flow properties of the material to be transported and discharged and may generally be in the range between 30° and 60°, for example, an angle of 45° as shown on FIG. 2.

Figure 3:
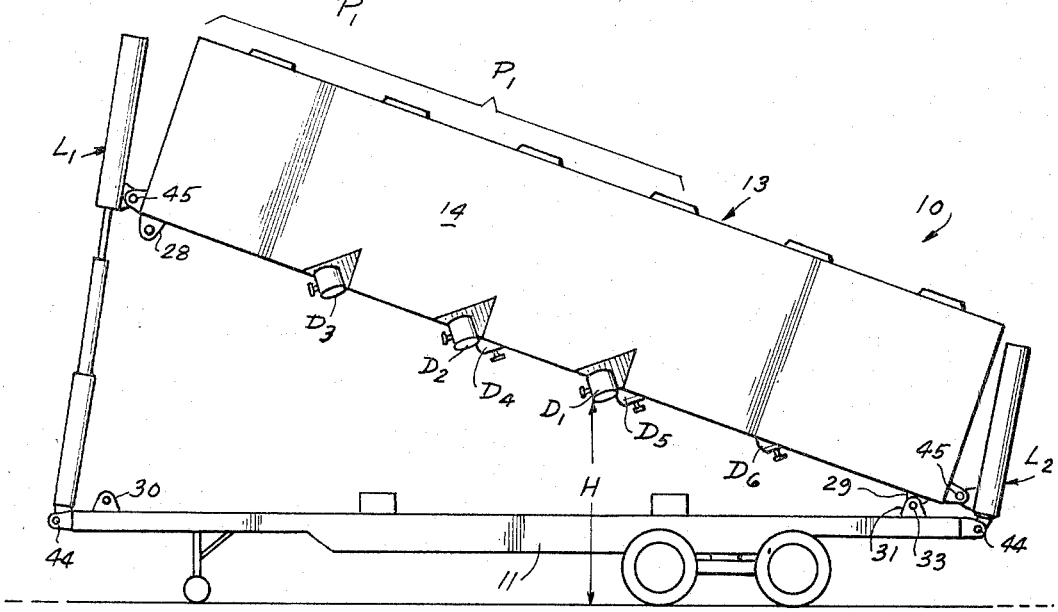

In the above described embodiment of the invention, body portions $P_2$ acts as a lever for supporting body portion $P_1$ from hinge pin 33 during tilting of body 13 to the position of FIG. 3 for discharging the contents of body portion $P_1$. Conversely, body portion $P_1$ acts as a lever for supporting body portion $P_2$ from hinge pin 32 during movement of body 13 to the position of FIG. 4 for discharging the contents of body portion $P_2$. However, as shown on FIGS. 6 to 9, inclusive, in a vehicle 10a embodying this invention, body 13a may be constituted by separate body portions $P'_1$ and $P'_2$ which are movable independently of each other from their normal level positions on the chassis 11a (FIG. 6) to their respective discharging positions shown on FIGS. 8 and 9. In vehicle 10a, actual levers 50 and 51 are arranged at the opposite sides of the upper portion of body 13a for supporting body portions $P'_1$ and $P'_2$ from their respective pivoting axes defined by pivot pins 33a and 32a during the selective pivotal movements of such body portions from their rest positions to their raised and tilted discharging positions.

More particularly, the opposite ends of levers 50 and 51 are pivotally connected by the pins 32a and 33a to the side walls of body portions $P'_1$ and $P'_2$, respectively, adjacent the tops of the latter at locations which are spaced substantially along the respective body portions from the inner end walls 20a (FIGS. 10 and 11) and 20b (FIGS.

8 and 9) of body portions P′₁ and P′₂, respectively, which are generally parallel to each other in the normal positions of the body portions and which constitute the partition means for separating the body portions from each other.

Each of levers 50 and 51 further has holes 52 (FIG. 9) and 53 (FIG. 8) spaced substantially from pivot pins 32a and 33a, respectively, at the opposite ends of the lever, and bushings 54 and 55 are provided in the opposite side walls of body portion P′₁ and in the opposite side walls of body portion P′₂, respectively, to register with the holes 52 and 53 when the levers 50 and 51 extend parallel to the longitudinal axis of the respective body portion. Locking pins 56 (FIGS. 6, 7 and 8) are provided for removable insertion in holes 52 and bushings 54 when the same are registered with each other, and locking pins 57 (FIGS. 6, 7 and 9) are similarly provided for removable insertion in holes 53 and bushings 55 when registered with each other.

It will be apparent that, when locking pins 56 and 57 are simultaneously engaged in holes 52 and bushings 54 and in holes 53 and bushings 55, respectively, as on FIGS. 6 and 7, body portions P′₁ and P′₂ are immovable with respect to each other, and thus are both held in their normal or level positions on chassis 11a. However, when locking pins 57 are removed from the associated holes 53 and bushings 55, then body portion P′₁ and levers 50 and 51 which are fixed thereto are free to swing upwardly, as a unit, about the axis defined by pivot pins 33a from which body portion P′₁ is spaced longitudinally by the sections of levers 50 and 51 projecting beyond the inner end wall 20a of body portion P′₁. Conversely, when locking pins 56 are removed from the associated holes 52 and bushings 54, body portion P′₂ and levers 50 and 51 which are fixed thereto are free to swing upwardly, as a unit, about the axis defined by pivot pins 32a from which body portion P′₂ is spaced longitudinally by the sections of levers 50 and 51 which extend beyond inner end wall 20b.

As in the previously described embodiment of this invention, a fluid pressure operated lifting device L₁ is pivotally connected, as at 44, to the chassis 11a and, as at 45, to body portion P′₁ at a location on the latter spaced from the partition defining end wall 20a, for example, at the opposite end wall of the body portion, as shown. Thus, when locking pins 57 are removed and lifting device is operated, body portion P′₁ and levers 50 and 51 are swung upwardly, as a unit, about the pivoting axis defined by pivot pins 33a so as to displace body portion P′₁ to the discharging position thereof shown on FIG. 8, and in which position body portion P′₁ is raised bodily from chassis 11a and also tilted or inclined downwardly in the direction toward its end wall 20a. In a similar manner, a fluid pressure operated lifting device L₂ is connected, as at 44 and 45, to chassis 11a and body portion P′₂ so that, when locking pins 56 are removed and lifting device L₂ is operated, body portion P′₂ and levers 50 and 51 are swung upwardly, as a unit, about the pivoting axis defined by pivot pins 32a so as to displace body portion P′₂ to its discharging position shown on FIG. 9, in which position body portion P′₂ is raised bodily from chassis 11a and also tilted or inclined downwardly in the direction toward its inner end wall 20b.

Body portions P′₁ and P′₂ have discharging spouts opening from the bottom thereof at least adjacent their inner end walls 20a and 20b, as at D′₁ and D′₄, respectively. Thus, when body portion P′₁ is moved to its tilted and raised discharging position (FIG. 8) its discharge spout D′₁ is raised from its normal position to a height H′ above the ground, which height may be as large as ten feet, to permit the discharge of the contents of body portion P′₁ into a tall container. Similarly, when body portion P′₂ is moved to its raised and tilted discharging position, its discharge spout D′₄ is raised from its normal position to the height H′ above the ground, which height may also be as large as ten feet.

Although vehicle 10a is shown with only a single discharge spout extending from each of its body portions P′₁ and P′₂ adjacent the inner end wall 20a or 20b thereof, it will be apparent that each of such body portions may be further divided into several compartments which are each provided with a discharge spout for discharging the contents thereof, as in the previously described vehicle 10.

As is shown on FIG. 7, the inner end walls 20a and 20b which define the partition separating the independently movable body portions P′₁ and P′₂ are preferably disposed at an angle with respect to the perpendicular to side walls 14a and 15a of the body portions. Thus, end wall 20a and side wall 14a of body portion P′₁ enclose an acutely angled corner in which the discharge spout D′₁ of body portion P′₁ is disposed, and the discharge spout D′₄ of body portion P′₂ is disposed in the similar acutely angled corner enclosed by end wall 20b and side wall 15a of body portion P′₂.

Figure 10:
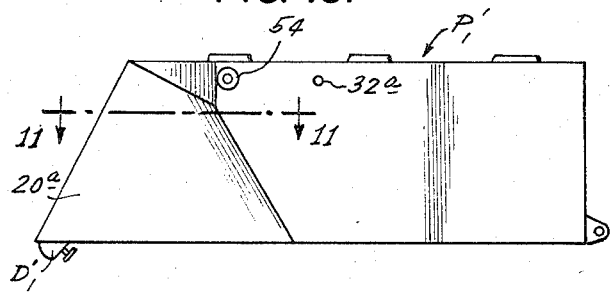
FIG. 10 is a side elevational view of one of the body portions of the vehicle of FIG. 6; but viewed from the side thereof opposite to that appearing on FIG. 6.
Figure 11:
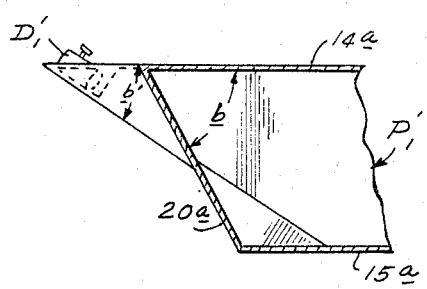
FIG. 11 is a fragmentary sectional view taken along the line 11—11 on FIG. 10.

As shown particularly on FIGS. 10 and 11 with respect to body portion P′₁, end wall 20a thereof may be laterally twisted so that the acute angle b enclosed by end wall 20a and side wall 14a at the top of body portion P′₁ is larger than the acute angle b′ enclosed by end wall 20a and side wall 14a at the bottom of the body portion. Similarly, end wall 20b of body portion P′₂ is laterally twisted so as to be generally parallel to end wall 20a when both body portions are in their normal positions on chassis 11a, whereby the acute angle enclosed by end wall 20b and the adjacent side wall 15a is larger at the top of body portion P′₂ than at the bottom of the latter. The purpose of the described laterally twisted configuration of end walls 20a and 20b is to provide the desired small acute angle, for example, an angle of 30°, in the corner at the bottom of the respective body portion from which the discharge spout D′₁ or D′₄ opens, thereby to afford the maximum reliability in the discharge of bulk material from each body portion, while minimizing the lengths of the levers 50 and 51 that are required.

In accordance with this invention, the system provided for selectively operating lifting devices L₁ and L₂ is preferably provided with safety means to permit such operation only when the conditions of the locking pins 56 and 57 are suitable for such operation. More specifically, the operation of lifting device L₁ for movement of body portion P′₁ to its discharging position (FIG. 8) is made possible only when locking pins 57 are removed to permit levers 50 and 51 to swing relative to body portion P′₂ about pivot pins 33a and locking pins 56 are positioned in holes 52 and bushings 54 to fix levers 50 and 51 with respect to body portion P′₁. Conversely, operation of lifting device L₂ is made possible only when locking pins 56 are removed to permit levers 50 and 51 to pivot relative to body portion P′₁ about pivot pins 32a, and locking pins 57 are inserted in holes 53 and bushings 55 to fix levers 50 and 51 relative to body portion P′₂.

Figure 12:
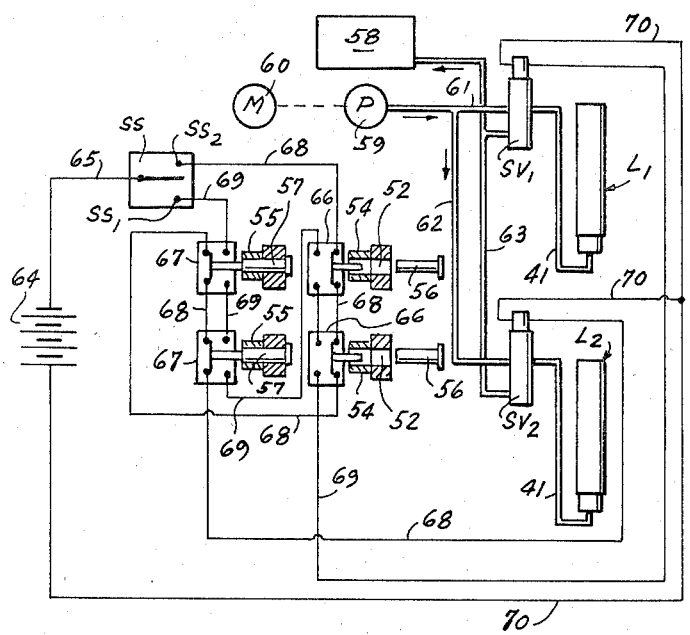
FIG. 12 is a diagrammatic view showing a system for controlling the operation of the lifting devices provided in the vehicle of FIG. 6.

Referring now to FIG. 12, it will be seen that a system for controlling the operation of lifting devices L₁ and L₂, as there illustrated, may include a reservoir 58 for hydraulic fluid, a pump 59 driven by a suitable motor 60 to draw fluid from reservoir 58 and to pump such fluid under pressure through conduits 61 and 62 to solenoid valves SV₁ and SV₂ which are, in turn, connected through conduits 41 with lifting devices L₁ and L₂. The solenoid valves SV₁ and SV₂ are further connected to a return conduit 63 which extends back to reservoir 58. Solenoid valves SV₁ and SV₂ may be of the type which communicate the respective conduits 41 with return conduit 63 so long as the solenoid valves are deenergized, thereby to permit the lifting devices L₁ and L₂ to return to, or remain in their inoperative or retracted conditions. On the other hand, when either solenoid valve SV₁ or solenoid valve SV₂ is energized, the respective conduit 41 is placed in communication with the conduit 61 or 62 for supplying fluid under pressure to the lifting device $L_1$ or $L_2$ and thereby causing operation of the latter.

The electrical circuitry for controlling the energization of the solenoids of valves $SV_1$ and $SV_2$ may include a battery 64 or other electric current source having one of its terminals connected through a lead 65 to the moveble contact of a selector switch SS, which movable contact is manually displaceable from its normal open position, as shown, into engagement with one or the other of two fixed contacts $SS_1$ or $SS_2$. Switches 66 are disposed adjacent bushings 54 and similar switches 67 are disposed adjacent bushings 55 to detect the presence or absence of locking pins 56 and 57 in the respective bushings. Switches 66 have normally closed contacts, that is, contacts that are closed when locking pins 56 are withdrawn from the respective bushings 54, and such normally closed contacts are connected in series in a circuit 68 extending from contact $SS_2$ of the selector switch to the solenoid of valve $SV_2$. Also interposed in series in the circuit 68 are normally open contacts of switches 67, which normally open contacts are closed in response to the presence of locking pins 57 in bushings 55, as shown. Switches 67 further have normally closed contacts, that is, contacts which are closed when locking pins 57 are removed from bushings 55, and such normally closed contacts of switches 67 are interposed in series in a circuit 69 extending from selector switch contact $SS_1$ to the solenoid of valve $SV_1$. Also interposed in series in circuit 69 are normally open contacts of switches 66 which are closed in response to the insertion of pins 56 in bushings 54. The circuits for energizing solenoid valves $SV_1$ and $SV_2$ are completed by return leads 70 extending from the solenoids back to battery 64.

It will be apparent that, when locking pins 56 are removed and locking pins 57 are in position to fix levers 50 and 51 with respect to body portion $P'_2$, as shown on FIG. 9, the manipulation of selector switch SS so that its movable contact engages fixed contact $SS_2$ will be effective to energize solenoid valve $SV_2$ so as to operate lifting device $L_2$ for displacing body portion $P'_2$ to its discharging position. However, if the selector switch is manipulated to engage its fixed contact $SS_2$ at a time when locking pins 56 are engaged in bushings 54, the circuit 68 for energizing solenoid valve $SV_2$ is interrupted at switches 66, thereby to prevent operation of lifting device $L_2$ so long as levers 50 and 51 are not free to pivot relative to body portion $P'_1$. Similarly, if selector switch SS is manipulated to cause operation of lifting device $L_2$ at a time when locking pins 57 are not engaged in bushings 55 to fix levers 50 and 51 relative to body portion $P'_2$, then the circuit 68 for energizing solenoid valve $SV_2$ will be broken at the normally open contacts of switches 67. It will also be apparent that operation of lifting device $L_1$ by energization of solenoid valve $SV_1$ will be possible, in response to manipulation of the movable contact of selector switch SS into engagement with its fixed contact $SS_1$, only when switches 66 are actuated by the insertion of locking pins 56 in bushings 54, thereby to fix levers 50 and 51 with respect to body portion $P_21$, and only when locking pins 57 are removed so as to permit levers 50 and 51 to pivot with respect to body portion $P'_2$ and to permit the return of switches 67 to their normal positions.

Although the circuits of FIG. 12 are particularly adapted to effect operation of the lifting device $L_1$ or the litfing device $L_2$ only when the structures supporting the body portions $P'_1$ and $P'_2$ are in condition to permit their movements to the respective discharging positions, it will be apparent that similar circuits can be provided in connection with the vehicle 10 to similarly permit operation of lifting device $L_1$ for moving body 13 to the position for discharging the contents of body portion $P_1$ only upon the removal of hinge pin 32, and conversely to permit operation of the lifting device $L_2$ for moving body 13 to the position for discharging the contents of body portion $P_2$ only upon the removal of hinge pin 33.

In each of the described embodiments of this invention, relatively simple structural arrangements are employed to permit the gravity discharge of bulk materials from compartments of the body of the vehicle through discharge spouts which are elevated in the discharging positions of the respective compartments. The bulk materials which can be thus discharged may be any that flow readily, and particularly those having an apparent specific weight (bulk weight) of less than 0.6 g./cm.$^3$. Such bulk materials may be inorganic or organic substances in the form of powders, granules, pellets and the like, for example, silica, carbon black, catalysts for the petroleum industry.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A vehicle for the transport of bulk material comprising an elongated, rigid wheeled chassis, an elongated body on said chassis having partition means extending laterally across the body intermediate its ends to divide the body into first and second portions defining compartments for containing the bulk material to be transported, said partition means being at an angle with respect to a perpendicular to the sides of said body so as to enclose, with said sides of the body, an acutely angled corner at one side of each of said body portions, each of said portions having discharge means opening from adjacent the bottom thereof at least in said acutely angled corner of the respective body portion for discharging bulk material from the respective compartments, means pivotally mounting said portions of the body for selective tilting relative to said chassis about first and second laterally extending axes, said first and second axes being spaced from said partition means in directions along said chassis toward the ends of the latter remote from said first and second body portions, respectively, a first lifting device connected between said chassis and said first body portion at a location on the latter spaced from said partition means and being operable to swing at least said first body portion upwardly about said first axis so that said first body portion is bodily raised from said chassis and tilted downwardly toward said discharge means of the first body portion adjacent said partition means, a second lifting device connected between said chassis and said second body portion at a location on the latter spaced from said partition means and being operable to swing at least said second body portion upwardly about said second axis so that said second body portion is bodily raised from said chassis and tilted downwardly toward said discharge means of the second body portion adjacent said partition means, and actuating means to selectively operate said first and second lifting devices individually.

2. A vehicle according to claim 1; wherein said partition means is laterally twisted so that the angle enclosed by said partition means and said one side of each body portion at said acutely angled corner is greater at the top of said partition means than at the bottom of the latter.

3. A vehicle according to claim 1; wherein said first and second body portions are integral and said first and second axes are disposed adjacent the opposite ends of said elongated body.

4. A vehicle according to claim 4; wherein said means pivotally mounting said body portions includes hinge parts secured to said body adjacent said opposite ends thereof, hinge parts secured to said chassis for alignment with said hinge parts adjacent the ends of the body, and removable hinge pins for releasably connecting the aligned hinge parts on the body and chassis.

5. A vehicle according to claim 1; wherein said body portions are separate from each other and have inner end walls constituting said partition means, and wherein said means pivotally mounting said body portions includes levers extending along the opposite sides of said body and having pivots connecting their opposite ends to said first and second body portions, respectively, to constitute said first and second axes, and releasable locking means for individually securing each of said body portions against pivoting with respect to said levers.

6. A vehicle according to claim 5; wherein said levers have bores therein spaced from said opposite ends thereof, and said releasable locking means includes bushings in the sides of said body portions spaced from said pivots for alignment with said bores, and locking pins dimensioned to be removably inserted through said bores into said bushings aligned therewith.

7. A vehicle according to claim 5; wherein said actuating means to selectively operate said first and second lifting devices includes means preventing operation of said first lifting device so long as said locking means secures said second body portion with respect to said levers, and means preventing operation of said second lifting device so long as said locking means secures said first body portion with respect to said levers.

8. A vehicle according to claim 5; wherein said levers have bores therein spaced from said opposite ends thereof, said releasable locking means includes bushings in the sides of said body portions spaced from said pivots for registration with said bores and locking pins insertable through said bores into said bushings, and said actuating means to selectively operate said first and second lifting devices includes means responsive to the presence of said locking pins in said bushings to permit the operation of said first lifting device only when locking pins are present in said bushings of the first body portion and absent from said bushings of the second body portion, and to permit the operation of said second lifting device only when locking pins are present in said bushings of the second body portion and absent from said bushings of the first body portion.

References Cited

UNITED STATES PATENTS

| | | | |
|---|---|---|---|
| 1,702,092 | 2/1929 | Sherwood | 298—17.6 |
| 2,439,439 | 4/1948 | Abraham | 298—7 |
| 3,123,017 | 3/1964 | Konig | 105—262 |
| 3,161,148 | 12/1964 | Konig | 105—262 |
| 3,320,000 | 5/1967 | Goodman | 298—17.6 X |

FOREIGN PATENTS 600,135    7/1934    Germany.

RICHARD J. JOHNSON, *Primary Examiner.*